US006937336B2

(12) United States Patent
Garcia et al.

(10) Patent No.: US 6,937,336 B2
(45) Date of Patent: Aug. 30, 2005

(54) OPTICAL ALIGNMENT SYSTEM FOR POWER TOOL

(75) Inventors: Jaime E. Garcia, Jackson, TN (US); Craig Allen Carroll, Bells, TN (US)

(73) Assignee: Black & Decker, Inc., Newark, DE (US)

( * ) Notice: Subject to any disclaimer, the term of this patent is extended or adjusted under 35 U.S.C. 154(b) by 167 days.

(21) Appl. No.: 10/219,576

(22) Filed: Aug. 15, 2002

(65) Prior Publication Data

US 2004/0032587 A1 Feb. 19, 2004

(51) Int. Cl.[7] .......................... G01C 1/00; G01C 15/00; B23B 39/06
(52) U.S. Cl. .......................... 356/399; 83/520; 33/286; 408/13; 408/16; 356/147
(58) Field of Search ................................ 356/399, 147; 83/520, 471; 362/89; 33/286, 263; 81/54, 52; 408/13, 16

(56) References Cited

U.S. PATENT DOCUMENTS

| | | |
|---|---|---|
| 2,109,976 A | 3/1938 | Pierce |
| 2,146,906 A | 2/1939 | Molier |
| 2,407,845 A | 9/1946 | Nemeyer |
| 2,557,029 A | 6/1951 | Griffin |
| 2,855,679 A | 10/1958 | Gibble |
| 3,175,458 A | 3/1965 | Da Costa |
| 3,572,937 A | 3/1971 | Baldwin et al. |
| 3,597,091 A | 8/1971 | Bowker et al. |
| 3,635,108 A | 1/1972 | Prince |
| 3,713,746 A | 1/1973 | Luthy |
| 3,728,027 A | 4/1973 | Watanabe |
| 3,780,777 A | 12/1973 | Davies |
| 3,837,757 A | 9/1974 | Levine |

(Continued)

FOREIGN PATENT DOCUMENTS

| | | |
|---|---|---|
| CN | 363472 | 7/1999 |
| CN | 2378150 Y | 5/2000 |

(Continued)

OTHER PUBLICATIONS

Applications/Wood, Z–LASER.com, http://www.z–/laser.de/e/anwendung/anwend_grp.htm?grp=Wood,.

Double Insulated Miter Sw with LaserLoc, Line–of–Cut / Indicator, Instruction Manual, Porter Cable.

Building Trades and Home Shop Machinery, Delta, Jan. 1993.

Request for Invalidation of Patent Right against CN 01268601.8 with the State Intellectual Property Office of China filed on Oct. 25, 2004.

Facts and Grounds for the Request for Invalidity filed on Oct. 25, 2004 against CN 01268601.8 with the State Intellectual Property Office of China.

Primary Examiner—Layla Lauchman
(74) Attorney, Agent, or Firm—Kirkpatrick & Lockhart Nicholson Graham LLP

(57) ABSTRACT

A power tool having a work surface and a spindle attached to the power tool and defining an axis of operation of the power tool. In one embodiment, the power tool may include a bracket above the work surface. The bracket may include first and second bracket receptacles and first second holders movably supported in the first and second bracket receptacles. A first laser generator may be mounted in the first holder at a first angle relative to an axis of the first holder, and it may adjustably project a first fan beam. A second laser generator may be mounted in the send holder at a second angle relative to an axis of the second holder, and it may adjustably project a second fan beam. The first and second fan beams may be adjusted to intersect along the axis of operation of the power tool.

50 Claims, 10 Drawing Sheets

U.S. PATENT DOCUMENTS

| | | |
|---|---|---|
| 3,854,836 A | 12/1974 | Weissman |
| 3,891,039 A | 6/1975 | Lagerstrom |
| 4,078,869 A | 3/1978 | Honeycutt |
| 4,255,056 A | 3/1981 | Peterson |
| 4,257,297 A | 3/1981 | Nidbella |
| 4,319,403 A | 3/1982 | Stearns |
| 4,338,723 A | 7/1982 | Benjamin |
| 4,383,373 A | 5/1983 | Couturier |
| 4,386,532 A | 6/1983 | Benjamin |
| 4,438,567 A | 3/1984 | Raiha |
| 4,447,956 A | 5/1984 | Chung |
| 4,450,627 A | 5/1984 | Morimoto |
| 4,469,931 A | 9/1984 | Macken |
| 4,503,740 A | 3/1985 | Brand et al. |
| 4,534,093 A | 8/1985 | Jahnke et al. |
| 4,566,202 A | 1/1986 | Hamar |
| 4,581,808 A | 4/1986 | Lawson et al. |
| 4,598,481 A | 7/1986 | Donahue |
| 4,651,732 A | 3/1987 | Frederick |
| 4,723,911 A | 2/1988 | Kurtz |
| 4,803,976 A | 2/1989 | Frigg et al. |
| 4,833,782 A | 5/1989 | Smith |
| 4,836,671 A | 6/1989 | Bautista |
| 4,885,965 A | 12/1989 | Weissman |
| 4,885,967 A | 12/1989 | Bell et al. |
| 4,887,193 A | 12/1989 | Dieckmann |
| 4,934,233 A | 6/1990 | Brundage et al. |
| 4,976,019 A | 12/1990 | Kitamura |
| 5,013,317 A | 5/1991 | Cole et al. |
| 5,031,203 A | 7/1991 | Trecha |
| 5,038,481 A | 8/1991 | Smith |
| 5,052,112 A | 10/1991 | MacDonald |
| 5,148,232 A | 9/1992 | Duey et al. |
| 5,161,922 A | 11/1992 | Malloy |
| 5,203,650 A | 4/1993 | McCourtney |
| 5,207,007 A | 5/1993 | Cucinotta et al. |
| 5,212,720 A | 5/1993 | Landi et al. |
| 5,267,129 A | 11/1993 | Anderson |
| 5,283,808 A | 2/1994 | Cramer et al. |
| 5,285,708 A | 2/1994 | Bosten et al. |
| 5,316,014 A | 5/1994 | Livingston |
| 5,320,111 A | 6/1994 | Livingston |
| 5,365,822 A | 11/1994 | Stapleton et al. |
| 5,375,495 A | 12/1994 | Bosten et al. |
| 5,387,969 A | 2/1995 | Marantette |
| 5,426,687 A | 6/1995 | Goodall et al. |
| 5,439,328 A | 8/1995 | Haggerty et al. |
| 5,446,635 A | 8/1995 | Jehn |
| 5,461,790 A | 10/1995 | Olstowski |
| 5,495,784 A | 3/1996 | Chen |
| 5,522,683 A | 6/1996 | Kakimoto et al. |
| 5,529,441 A | 6/1996 | Kosmowski et al. |
| 5,546,840 A | 8/1996 | Supe-Dienes |
| 5,579,102 A * | 11/1996 | Pratt et al. ............... 356/3.12 |
| 5,593,606 A | 1/1997 | Owen et al. |
| 5,644,616 A | 7/1997 | Landi et al. |
| 5,661,775 A | 8/1997 | Cramer et al. |
| 5,662,017 A | 9/1997 | Mellon |
| 5,667,345 A | 9/1997 | Wiklund |
| 5,675,899 A | 10/1997 | Webb |
| 5,741,096 A | 4/1998 | Olds |
| 5,777,562 A | 7/1998 | Hoffman |
| 5,782,842 A | 7/1998 | Kloess et al. |
| 5,784,792 A | 7/1998 | Smith |
| 5,797,670 A | 8/1998 | Snoke et al. |
| 5,835,517 A | 11/1998 | Jayaraman et al. |
| 5,835,519 A | 11/1998 | Tsukamoto et al. |
| 5,862,727 A | 1/1999 | Kelly |
| 5,911,482 A | 6/1999 | Campbell et al. |
| 5,918,523 A | 7/1999 | Cutter |
| 5,943,931 A | 8/1999 | Stumpf et al. |
| 5,949,810 A | 9/1999 | Star et al. |
| 5,968,383 A | 10/1999 | Yamazaki et al. |
| 5,995,230 A | 11/1999 | Madlener et al. |
| 5,996,460 A | 12/1999 | Waite |
| 6,023,071 A | 2/2000 | Ogura et al. |
| 6,035,757 A | 3/2000 | Caluori et al. |
| 6,223,794 B1 | 5/2001 | Jones |
| 6,239,913 B1 | 5/2001 | Tanaka |
| 6,263,584 B1 | 7/2001 | Owens |
| 6,301,997 B1 | 10/2001 | Welte |
| 6,328,505 B1 | 12/2001 | Gibble |
| 6,375,395 B1 | 4/2002 | Heintzeman |
| 6,413,022 B1 | 7/2002 | Sarh |
| 6,419,426 B1 | 7/2002 | Chalupa et al. |
| 6,493,955 B1 | 12/2002 | Moretti |
| 6,494,590 B1 | 12/2002 | Paganini et al. |
| 6,550,118 B2 | 4/2003 | Smith et al. |
| 6,565,227 B2 | 5/2003 | Davis |
| 6,587,184 B2 | 7/2003 | Wursch et al. |
| 6,593,587 B2 | 7/2003 | Pease |
| 6,621,565 B2 * | 9/2003 | Pratt et al. ............... 356/141.4 |
| 6,647,868 B2 * | 11/2003 | Chen ............... 100/99 |
| 6,763,597 B2 | 7/2004 | Lysen |
| 2001/0029819 A1 | 10/2001 | Okouchi |
| 2001/0034951 A1 | 11/2001 | Sears |
| 2001/0049988 A1 | 12/2001 | Ushiwata et al. |
| 2002/0000148 A1 | 1/2002 | Brun |
| 2002/0054491 A1 | 5/2002 | Casas |
| 2002/0059871 A1 | 5/2002 | Chen |
| 2002/0131267 A1 | 9/2002 | Van Osenbruggen |
| 2002/0146295 A1 | 10/2002 | Schaer et al. |
| 2002/0164217 A1 | 11/2002 | Peterson |
| 2003/0000355 A1 | 1/2003 | Butler et al. |
| 2003/0027353 A1 | 2/2003 | Bright et al. |
| 2003/0029050 A1 | 2/2003 | Fung et al. |
| 2003/0197138 A1 | 10/2003 | Pease et al. |
| 2003/0209678 A1 | 11/2003 | Pease |

FOREIGN PATENT DOCUMENTS

| | | |
|---|---|---|
| CN | 2508922 Y | 9/2002 |
| CN | 2528568 Y | 1/2003 |
| CN | 2546122 Y | 4/2003 |
| DE | 2838968 | 3/1980 |
| DE | 3324428 A1 | 1/1984 |
| DE | 33334284 A1 | 4/1985 |
| DE | 3918070 A1 | 12/1990 |
| DE | 4435573 A1 | 4/1996 |
| DE | 19819332 A1 | 11/1998 |
| DE | 19907880 A1 | 8/2000 |
| DE | 10037532 A1 | 2/2001 |
| EP | 0366039 A2 | 5/1990 |
| JP | 55125954 A | 9/1980 |
| JP | 61061705 A | 3/1986 |
| JP | 61-131246 | 6/1986 |
| JP | 61-159312 | 7/1986 |
| JP | 62166914 A | 7/1987 |
| JP | 62-274738 | 11/1987 |
| JP | 63162143 A | 7/1988 |
| JP | 8197381 | 8/1996 |
| JP | 10109253 | 4/1998 |
| JP | 11-170203 | 6/1999 |
| JP | 2000/225602 | 8/2000 |
| JP | 2000-225603 | 8/2000 |
| JP | 2000-317901 | 11/2000 |
| JP | 2000343309 A2 | 12/2000 |
| JP | 2001-150401 | 6/2001 |
| JP | 2001-157951 | 6/2001 |
| JP | 2001-158003 | 6/2001 |
| JP | 2001-300818 | 10/2001 |
| JP | 2001-300902 | 10/2001 |
| JP | 2001-347501 | 12/2001 |
| TW | 537083 Y | 12/1990 |
| TW | 517615 Y | 5/1991 |
| TW | 411888 | 11/2000 |

* cited by examiner

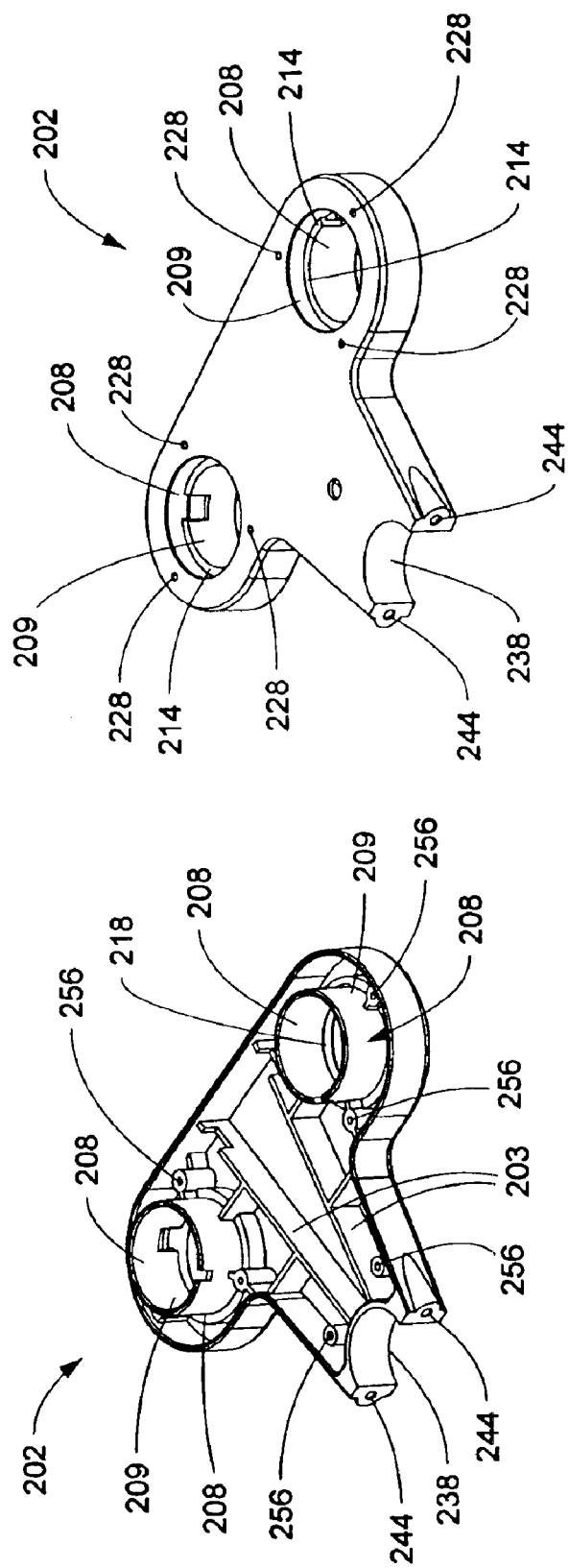

OPTICAL ALIGNMENT SYSTEM FOR POWER TOOL

BACKGROUND OF THE INVENTION

Recent patents disclose the use of lasers for alignment purposes in various applications. For example, U.S. Pat. No. 5,741,096 discloses a line-laser assisted alignment apparatus for a drill bit, and U.S. Pat. No. 5,320,111 discloses a light beam locator and guide for a biopsy needle.

As the use of lasers in commonly used power tools increases, there is a need for providing an optical alignment system that is compact, cost-effective and user friendly.

SUMMARY

One embodiment of the invention provides a power tool having a work surface and a spindle defining an axis of operation of the power tool and facing the work surface. The power tool may include a bracket attached to the power tool above the work surface. The bracket may include first and second bracket receptacles, a first holder movably supported in the first bracket receptacle, and a second holder movably supported in the second bracket an axis of the first holder, and it may adjustably project a first fan beam. A second laser generator may be mounted in the send holder at a second angle relative to an axis of the second holder, and it may adjustably project a second fan beam. The first and second fan beams may be adjusted to intersect along the axis of operation of the power tool.

BRIEF DESCRIPTION OF THE DRAWINGS

In the accompanying Figures, there are shown present embodiments of the invention wherein like reference numerals are employed to designate like parts and wherein:

FIG. 5 is a bottom perspective view of an embodiment of a bracket of the optical alignment system of FIG. 2;

FIG. 6 is a top perspective view of the bracket of FIG. 5;

DETAILED DESCRIPTION OF THE INVENTION

Figures 1, 2:
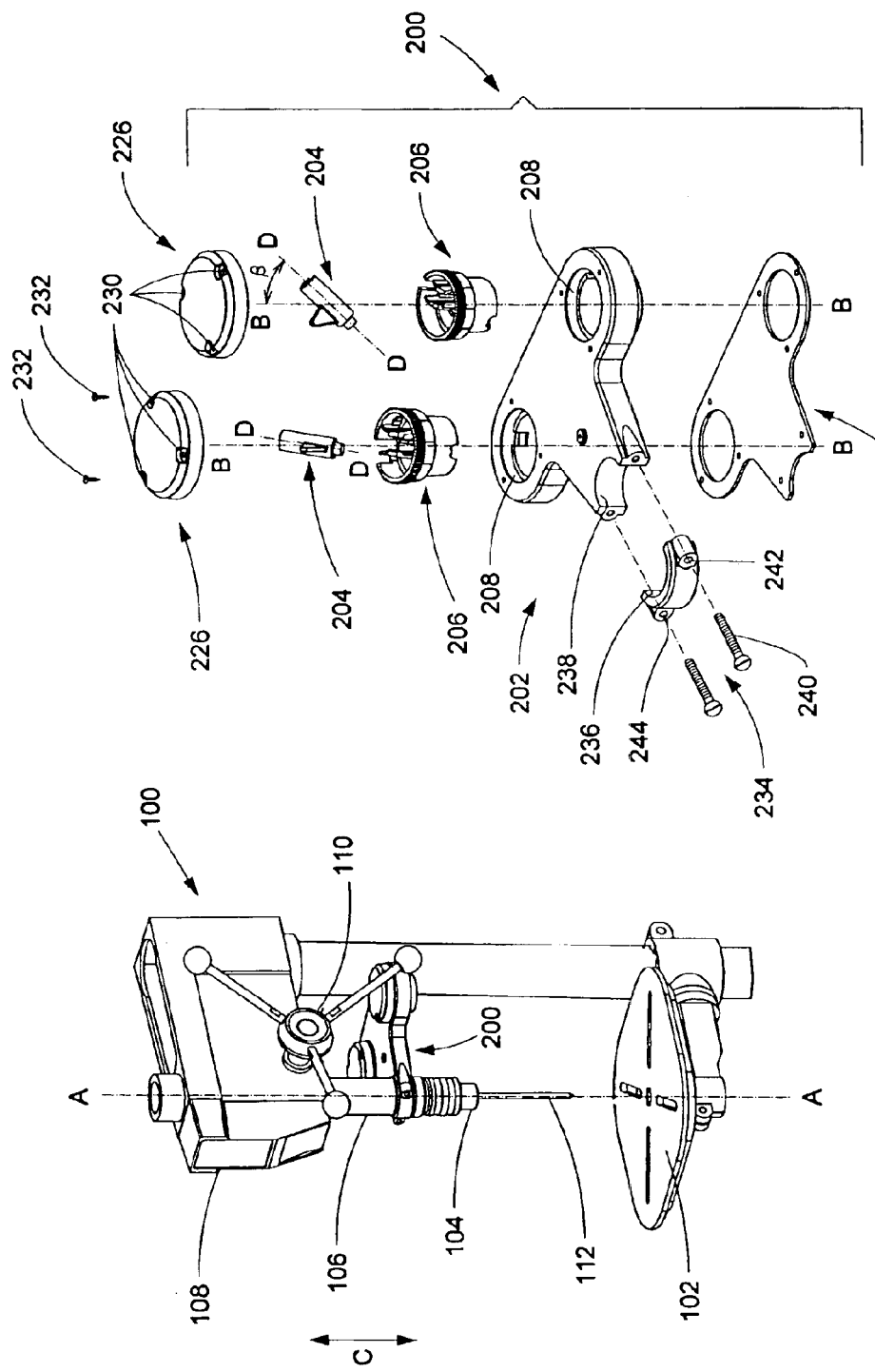
FIG. 1 is a perspective view of an embodiment of a power tool according to the invention.
FIG. 2 is an exploded assembly view of an optical alignment system according to the present invention.

Referring now to the drawings for the purpose of illustrating various embodiments of the invention and not for the purpose of limiting the same, it is to be understood that standard components or features that are within the purview of an artisan of ordinary skill and do not contribute to the understanding of the various embodiments of the invention are omitted from the drawings to enhance clarity. In addition, it will be appreciated that the characterizations of various components and orientations described herein as being "vertical" or "horizontal", "right" or "left", "side", "top" or "bottom", are relative characterizations only based upon the particular position or orientation of a given component for a particular application.

Figure 15:
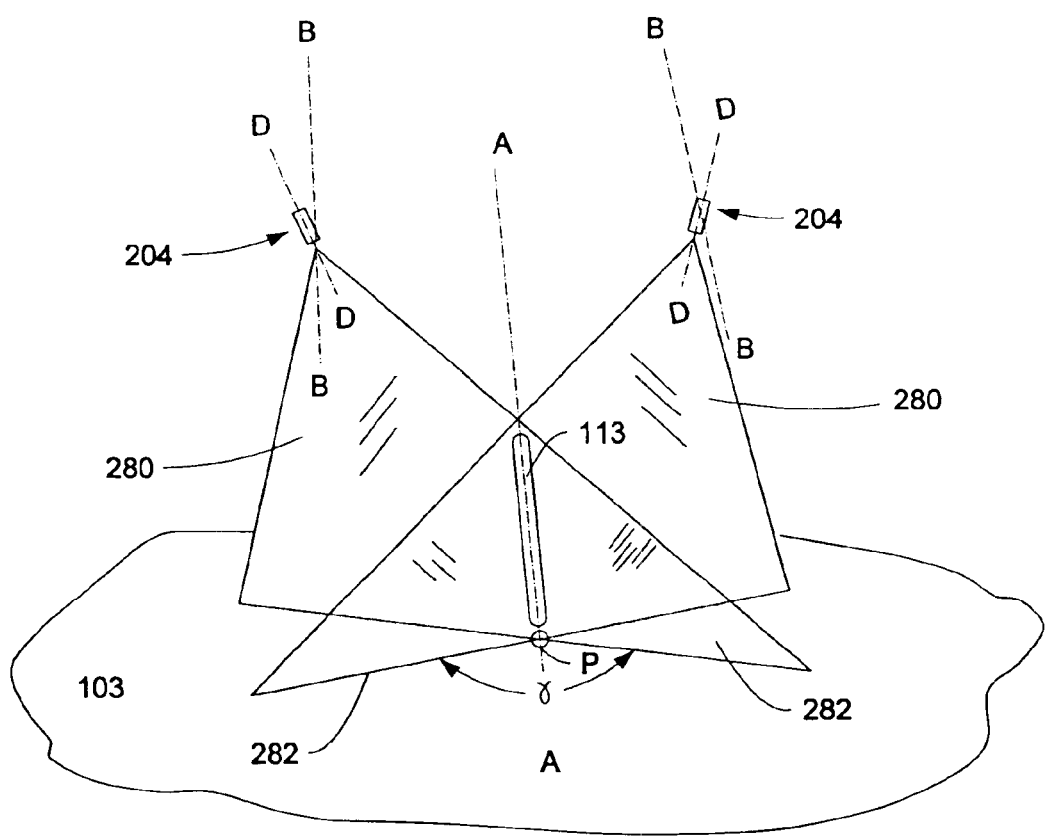
FIG. 15 is a diagram showing one mode of operation of an optical alignment system according to the present invention.

FIG. 1 depicts an embodiment of a power tool 100 having a table or a work surface 102 and a tool holder or spindle 104. The spindle 104 may be supported on a quill 106 that is movably attached to a head 108 of the power tool 100. The quill 106 may be moved in the directions indicated by arrows "C" by using a crank or lever mechanism 110 in a known manner. The spindle 104 defines an axis "A—A" of operation of the power tool 100 and may include a chuck portion for supporting a tool 112, such as, for example, a drill bit, or an alignment rod 113 which may be used before operating the power tool 100 as is discussed in connection with FIG. 15.

The power tool 100 may comprise any type of power tool or cutter having an axis of operation A—A, such as, for example, a drill press, a gang drill, a turret drill, a multiple-spindle drill, a boring machine, a band saw, etc.

An embodiment of an optical alignment system 200 of the present invention may be mounted on the power tool 100. See FIGS. 1–2. The optical alignment system 200 may include a bracket 202 for supporting two laser generators 204 that each have longitudinal axes designated as "D—D". In one embodiment, the bracket 202 may include two spaced-apart open-ended receptacles 208. in one embodiment, for example, the centers of the receptacles 208 are separated by a distance "L". See FIGS. 5 and 6. Each receptacle 208 may include a cylindrical portion 209 that extends below the lower surface of the bracket 202 and defines an inner seat 214. Each receptacle 208 may receive a holder 206 in which a corresponding laser generator 204 is mounted. See FIGS. 7 and 8. In one embodiment, the holder 206 may include a plurality of snap fit pillars 210 that are arranged to receive and hold a laser generator 204 such that its longitudinal axis D—D defines a desired dip angle β relative to a holder axis B-B. The dip angle β may be chosen to be, for example, 45 degrees. See FIG. 2.

Figure 10:
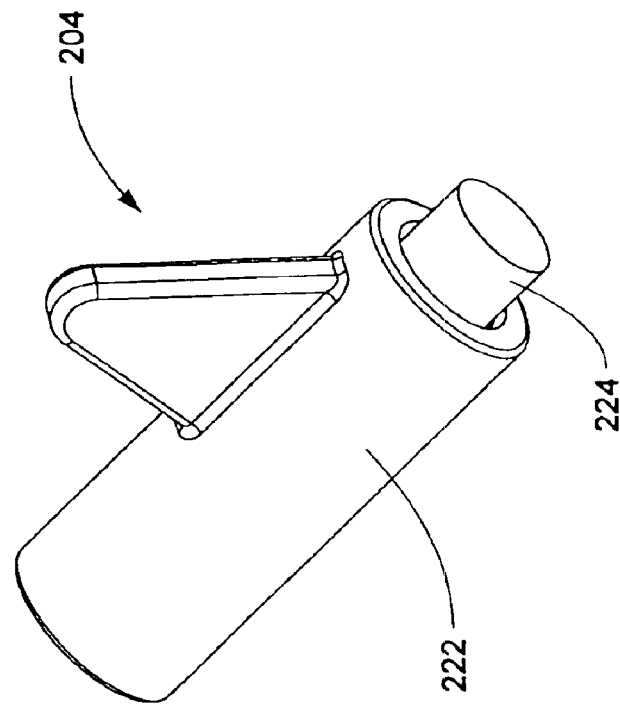
FIG. 10 is a front perspective view of the laser generator of FIG. 9.
Figure 9:
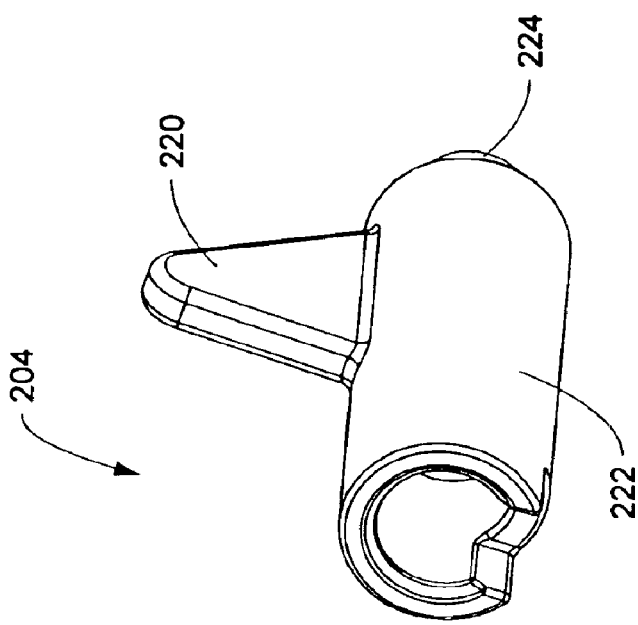
FIG. 9 is a rear perspective view of an embodiment of a laser generator of the optical alignment system of FIG. 2.

Each laser generator 204 may comprise a commercial laser generator of the type that produces a fan beam of light, such as the laser line generators manufactured by Sean & Stephen Corporation of Taiwan and China under Model 1894. However. Other commercially available generators could be employed. In one embodiment, the laser generator 204 may be customized to include a handle or knob arrangement 220 that may be attached to a barrel 222 that encloses the laser unit 224 of the laser generator 204. See FIGS. 9 and 10. Such handle 220 can facilitate any adjustment of the laser generator 204 within its holder 206.

The laser generators 204 may be powered by a battery or by the power source of the power tool via electrical cables connected to electrical system of the power tool (not shown). In the latter case, an AC to DC converter may be required, as well as an appropriately sized voltage reducer.

Figure 8:
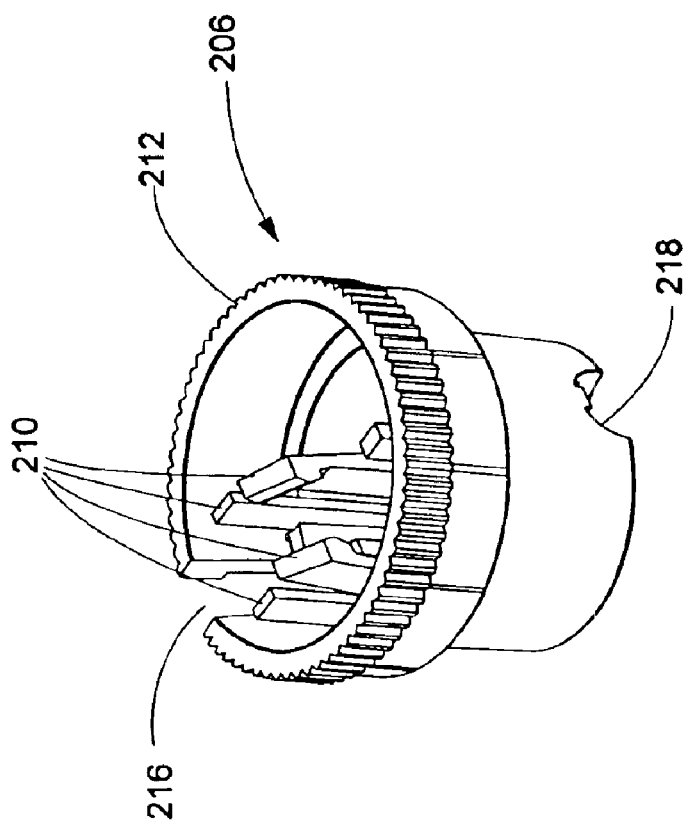
FIG. 8 is a front perspective view of the holder of FIG. 7.
Figure 7:
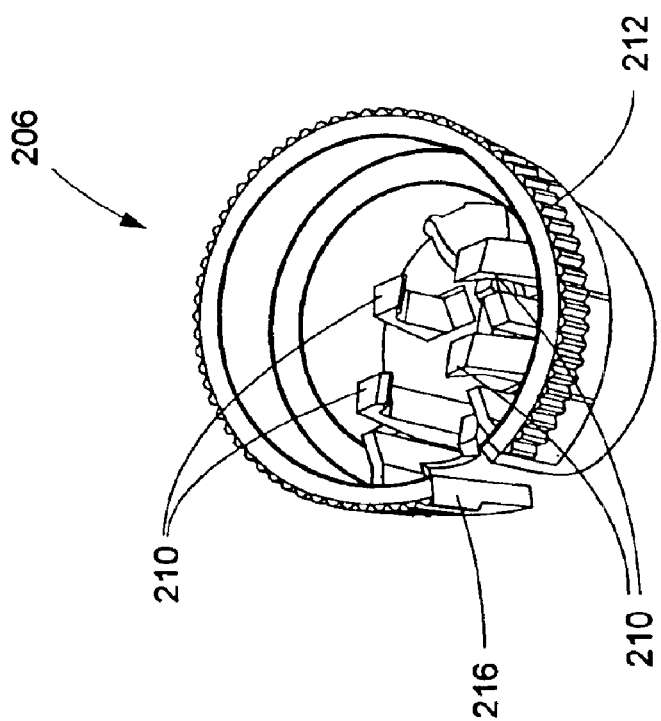
FIG. 7 is a rear perspective view of an embodiment of a holder of the optical alignment system of FIG. 2.

As can be seen in FIGS. 7 and 8, one embodiment, the holder 206 may have a cylindrical rim 212 that extends around the perimeter of the seat 214 of the receptacle 208. The rim 212 may include an opening 216 to facilitate insertion of the laser generator 204 into the holder 206 at the desired dip angle β. The holder 206 may also include a bottom notch 218 to allow unobstructed passage of light from the laser generator 204 to a workpiece that is supported on the table 102 as will be further discussed below.

Figure 12:
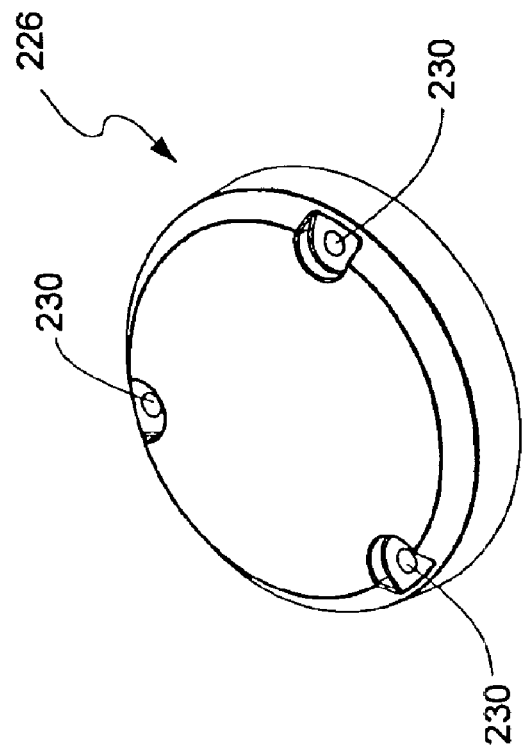
FIG. 12 is a front perspective view of the holder cover of FIG. 9.
Figure 11:
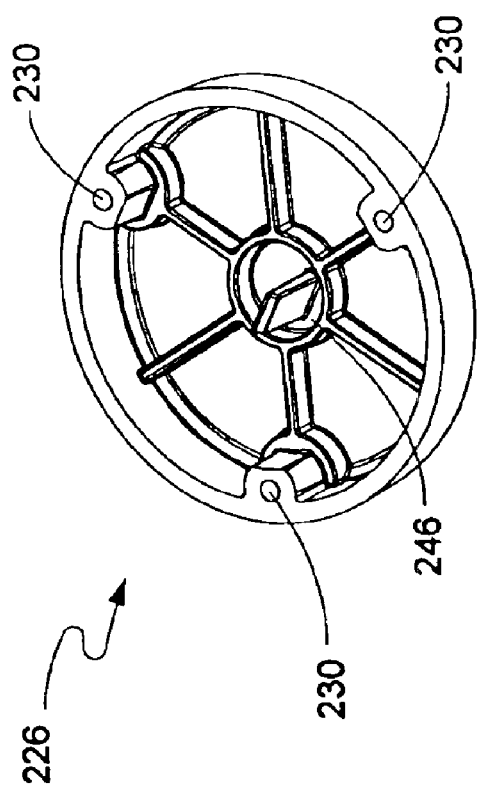
FIG. 11 is a rear perspective view of an embodiment of a holder cover of the holder of FIG. 7.

In one embodiment, the optical alignment system 200 may also include a holder cover 226. See FIGS. 11 and 12. The holder cover 226 may be sized to fit over and cover the holder 206 with the laser generator 204 mounted therein. As can be seen in FIG. 2, the holder cover 226 may be attached to the bracket 202 with conventional fasteners 232, such as, for example, screws or bolts, which pass through holes 230 in the holder cover 226 and are received in corresponding holes 228 of the bracket 202. It will be appreciated that other fasteners, such as, for example, hook and loop attachments may be also used. In one embodiment, the holder cover 226 may include a tab 246 that protrudes from the surface of the holder cover 226 to face the holder 206 when the holder cover 226 is attached to the bracket 202. When the holder cover 226 is attached to the bracket 202, the tab 246 prevents accidental rotation of the laser generator 204. The holder cover 226 may also prevent rotation of the holder 206 when it is attached on the bracket 202.

In the embodiment shown in FIGS. 1 and 2, the bracket 202 may be rotatably attached to the moving quill 106 of the power tool with an end cap 234. As can be seen in FIG. 2, the end cap 234 include a semi-cylindrical surface 236 that is connected in registry with a corresponding semi-cylindrical surface 238 of the bracket 202 forming an opening sized to receive the quill 106. The end cap 234 may be attached to the bracket 202 with fasteners 240 through corresponding holes 242 and 244 in the end cap 234 and the bracket 202. By loosening or removing the fasteners 240, the bracket 202 may be moved to a different position along the quill 106 or may be rotated about the operation axis A-A, when, for example, it is necessary to accommodate an oddly-shaped workpiece.

Figure 13:
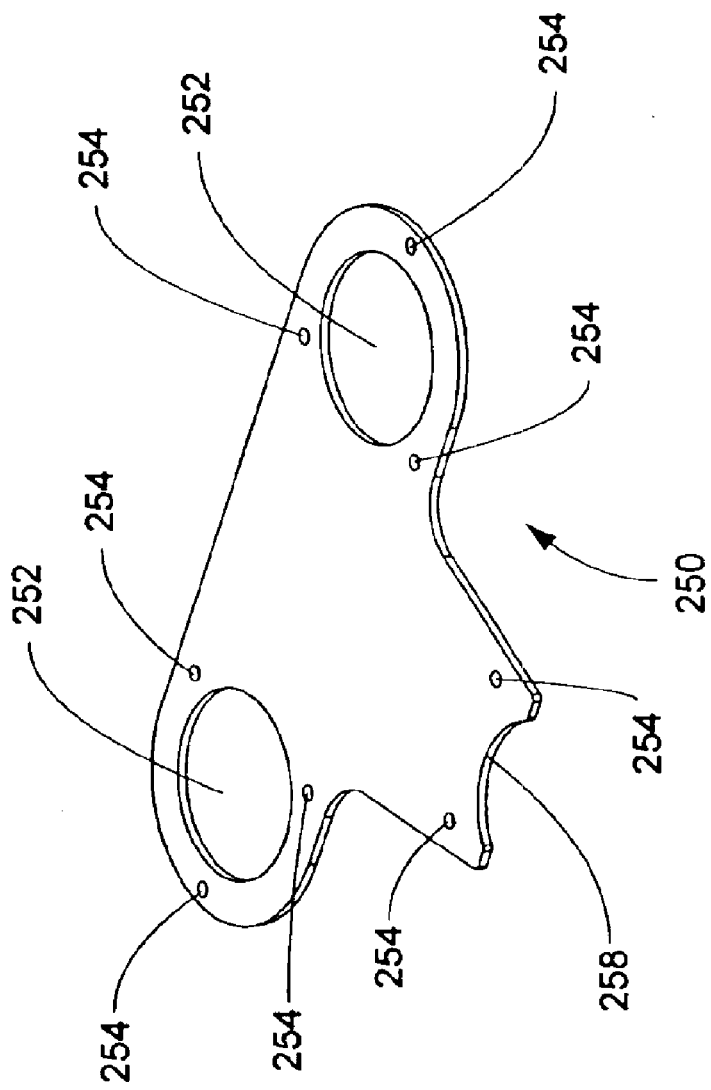
FIG. 13 is an embodiment of a bracket cover of the bracket of FIG. 5.

In one embodiment, the optical alignment system 200 may also include a bracket cover 250 attached to the bottom of the bracket 202 with conventional fasteners (not shown), which may be inserted through a plurality of holes 254 to fasten the bracket cover 250 to the bracket 202 in corresponding holes 256 on the bottom of the bracket. See FIGS. 2, 5 and 13. The bracket cover 250 may include openings 252 that are sized to fit over the cylindrical portions 209 of the receptacles 208. The bracket cover 250 may also include a curved surface 258 shaped to fit around the quill 106, when the bracket 202 is attached to the quill 106. In one embodiment, the bracket 202 may also include one or more reinforcing ribs 203.

Figure 4:
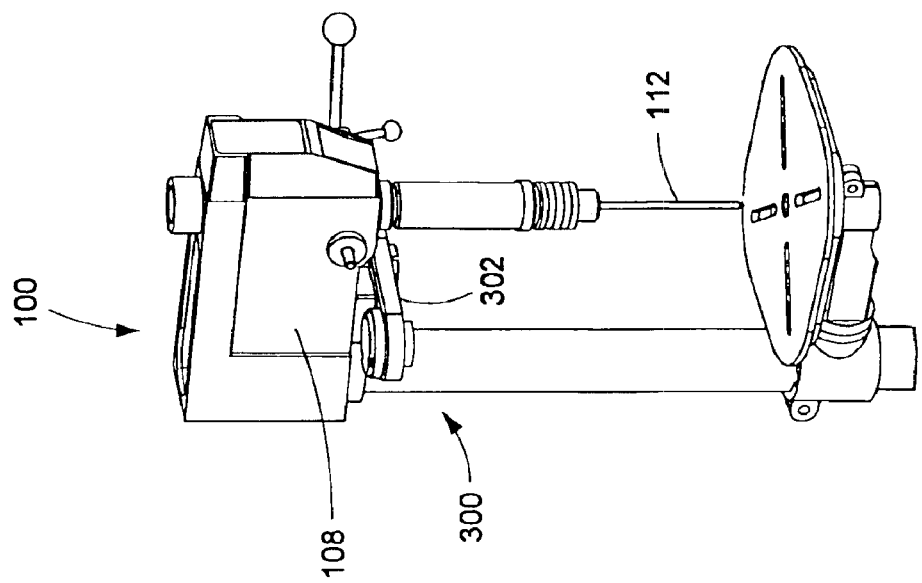
FIG. 4 is a left side perspective view of the power tool of FIG. 3.
Figure 3:
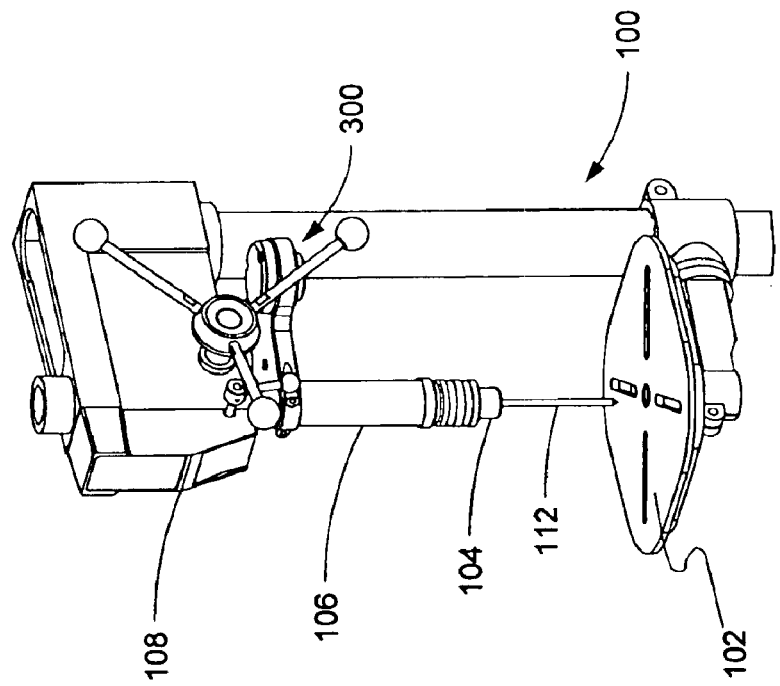
FIG. 3 is a right side perspective view of another embodiment of a power tool according to the present invention.
Figure 14:
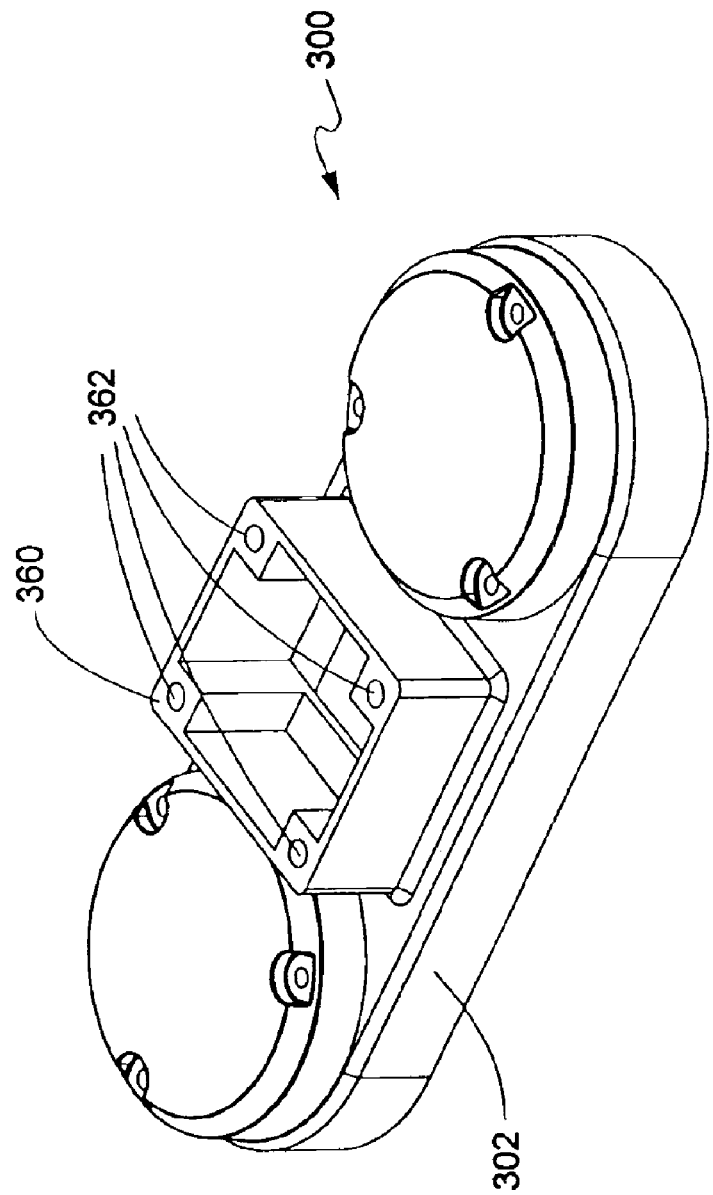
FIG. 14 is a perspective view of an embodiment of an optical alignment system for the power tool of FIG. 3.

Another embodiment of the optical alignment system 300 is shown in FIGS. 3, 4 and 14. In this embodiment, the optical alignment system 300 has a bracket 302 that is adapted to be attached to the underside of the head 108 of the power tool 100, but may include laser generators 204, holders 206, receptacles 208, and holder covers 226 of the types described above. The bracket 302 may include an attachment element 360 that has mounting holes 362 for attaching the bracket 302 to the underside of the head 108, by means of threaded fasteners or the like (not shown). Alternatively, the bracket 302 may be cast as an integral part of the underside of the head 108 of the power tool 100.

In operation, the optical alignment system 200 may be powered such that each laser generator 204 projects a fan beam of light in the form of a fan plane 280. See FIG. 15. Each of the laser generators 204 may be rotated about its respective axis D—D, until the corresponding fan plane 280 is parallel to the operation axis A—A. Each holder 206 may then be rotated about its axis B—B until the corresponding fan plane 280 passes through the operation axis A—A. In this position, the fan planes 280 intersect along the operation axis A—A, projecting two intersecting lines of light 282 on the table 102 or on a workpiece 103 that is supported by the table 102. The lines of light 282 intersect at an angle γ at a point of intersection "P" that indicates the position for the operation of the tool 112 that is mounted on the spindle 104. The magnitude of the angle γ depends upon the distance L that separates the receptacles 208 in the bracket 202 and the distance between the receptacles 208 and the operation axis A—A. In one embodiment, an alignment rod 113 may be supported by the spindle 104 prior to operation to guide the adjustment process of the optical alignment system 200.

After the laser generators 204 have been oriented in the above described manner such that they project the intersecting lines 282 that intersect at the point P through which the operation axis A—A extends, the user may place the workpiece 103 on the table 102. Presumably, the user may have marked a portion of the workpiece 103 with a reference mark for designation the exact point at which the tool 112 is to contact and act upon the workpiece. For example, in the case of a drill arrangement of the type depicted in FIG. 1, the user places the pre-marked workpiece 103 on the table 102 and manipulates it to a position wherein the point of intersection P between the intersecting lines 282 coincides with the point marked on the workpiece 103. The workpiece 103 is then held in that position while the user advances the powered drill bit 112 through the workpiece 103 to drill the desired hole therethrough. The reader will readily appreciate that the optical alignment system permits the user to accurately and quickly position the workpiece 103 to achieve the desired results.

Figure 17:
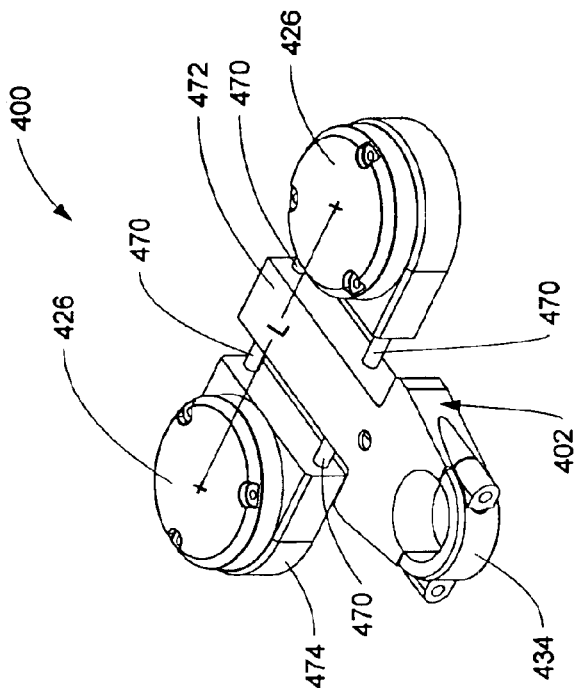
FIG. 17 is a perspective view of an embodiment of another optical alignment system for the power tool of FIG. 16.
Figure 16:
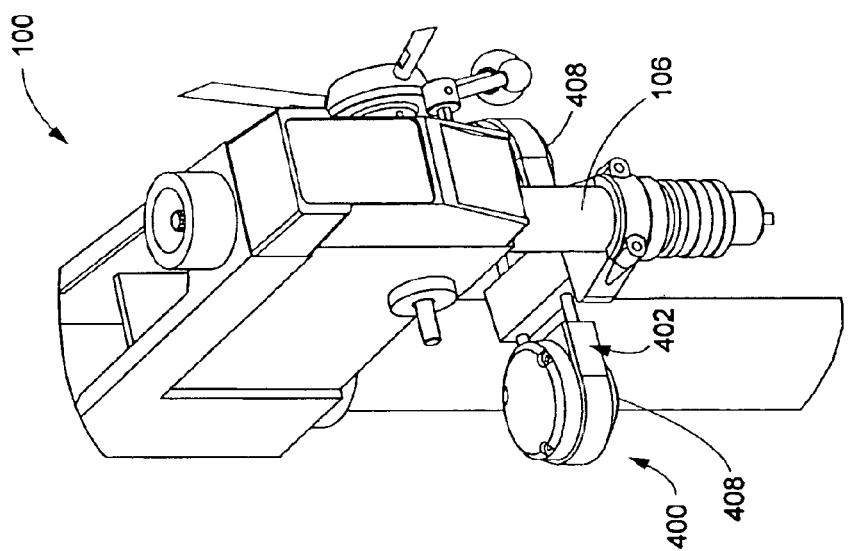
FIG. 16 is a left side perspective view of an embodiment of another power tool according to the present invention.

As can be seen in FIGS. 16 and 17, one embodiment of the optical alignment system 400 includes a bracket 402 that has one or more spacing connectors 470 that movably connect two outer portions 474 of the bracket 402 with a center portion 472 of the bracket 402. The outer portions 474 include corresponding receptacles 408 for the laser generators and their holders, which may be of the types and construction described above. The spacing connectors 470 may include for example, telescoping arms, or spring-loaded extenders or other spacer devices which may be used to change the distance L that separates the receptacles 408 (or the corresponding holders and laser generators) without removing the bracket 402 from the power tool 100. Accordingly, the angle of intersection γ may be adjusted as desired during the operation of the optical alignment system 400. FIGS. 16 and 17 illustrate an embodiment of the optical alignment system 400 that includes an end cap 434 for attaching the bracket 402 to the quill 106. It will be appreciated, however, that spacing connectors 470 may also be included in embodiments in which to optical alignment system is attached to the head 108 of the power tool 100, as in the embodiments depicted in FIGS. 3, 4 and 14.

The optical alignment systems 200, 300, 400 of the present invention provide a compact, space-saving, cost-effective and easy to use alignment capability to any type of tool that operates along an axis.

Whereas particular embodiments of the invention have been described herein for the purpose of illustrating the invention and not for the purpose of limiting the same, it will be appreciated by those of ordinary skill in the art that numerous variations of the details, materials and arrangement of parts may be made within the principle and scope of the invention without departing from the spirit of the invention. The preceding description, therefore, is not meant to limit the scope of the invention. Rather the scope of the invention is to be determined only by the appended claims and their equivalents.

What is claimed is:

1. A power tool comprising:
   a spindle attached to the power tool and operably supported relative to a work surface such that the spindle faces the work surface, the spindle defining an axis of operation of the power tool;
   a bracket attached to the power tool above the work surface, the bracket having first and second bracket receptacles therethrough;
   a first holder movably supported in the first bracket receptacle;
   a second holder movably supported in the second bracket receptacle;
   a first laser generator mounted in the first holder at a first angle relative to an axis of the first holder and adjustably projecting a first fan beam; and
   a second laser generator mounted in the second holder at a second angle relative to an axis of the second holder and adjustably projecting a second fan beam,
   such that the first and second fan beams are adjusted to intersect along the axis of operation of the power tool.

2. The power tool of claim 1, wherein the bracket receptacles are separated by a predetermined distance that results in the intersection of the first and second fan beams along the axis of operation of the power tool at a predetermined angle of intersection.

3. The power tool of claim 2, wherein the predetermined angle of intersection is 60 degrees.

4. The power tool of claim 1, wherein the bracket is rotatably and movably mounted on a quill that supports the spindle.

5. The power tool of claim 1, wherein the bracket is integral with the power tool.

6. The power tool of claim 1, wherein the bracket is fixed to a head of the power tool.

7. The power tool of claim 1, wherein the first holder includes at least one first snap fit member for retaining the first laser generator at the first angle.

8. The power tool of claim 7, wherein the first laser generator includes a knob for rotating the first laser generator about a longitudinal axis of the first laser generator.

9. The power tool of claim 8, further including a holder cover attached to the first holder.

10. The power tool of claim 9, wherein the holder cover includes a locking tab that protrudes from the holder cover into the first holder.

11. The power tool of claim 7, wherein the second holder includes at least one second snap fit member for retaining the second laser generator at the second angle.

12. The power tool of claim 7, wherein the first angle is 45 degrees.

13. The power tool of claim 11, wherein the second angle is 45 degrees.

14. The power tool of claim 7, further comprising a bracket cover attached to the bracket.

15. The power tool of claim 4, further comprising an end cap for removably connecting the bracket to the quill.

16. The power tool of claim 1, further comprising at least one spacing connector movably connecting the first bracket receptacle to the second bracket receptacle.

17. The power tool of claim 16, wherein said spacing connector comprises a telescoping arm.

18. The power tool of claim 1, further comprising means for adjusting the distance between the first and second holders.

19. The power tool of claim 1, wherein the power tool comprises a drilling device.

20. An optical alignment system for a power tool having a table and a spindle attached to the power tool, the spindle defining an axis of operation of the power tool, the optical alignment system comprising:
    a bracket attachable to the power tool above the table, the bracket including first and second bracket receptacles therethrough;
    a first holder rotatably received in the first bracket receptacle;
    a second holder rotatably received in the second bracket receptacle;
    a first laser generator mounted in the first holder at a first angle relative to an axis of the first holder and adjustably projecting a first fan beam; and
    a second laser generator mounted in the second holder at a second angle relative to an axis of the second holder and adjustably projecting a second fan beam,
    such that the first and second fan beams may be adjusted to intersect along the axis of operation of the power tool.

21. The optical alignment system of claim 20, wherein the bracket receptacles are separated by a distance that results in the intersection of the first and second fan beams along the axis of operation of the power tool at a predetermined angle of intersection.

22. The optical alignment system of claim 21, wherein the predetermined angle of intersection is 60 degrees.

23. The optical alignment system of claim 20, wherein the first holder includes at least one first snap fit member for retaining the first laser generator at the first angle.

24. The optical alignment system of claim 23, wherein the first laser generator has a longitudinal axis and includes a knob for rotating the first laser generator about its longitudinal axis.

25. The optical alignment system of claim 24, further including a holder cover attached to the first holder.

26. The optical alignment system of claim 25, wherein the holder cover includes a locking tab protruding from the holder cover into the first holder.

27. The optical alignment system of claim 23, wherein the second holder includes at least one second snap fit member for retaining the second laser generator at the second angle.

28. The optical alignment system of claim 23, wherein the first angle is 45 degrees.

29. The optical alignment system of claim 27, wherein the second angle is 45 degrees.

30. The optical alignment system of claim 23, further comprising a bracket cover attached to the bracket.

31. The optical alignment system of claim 20, further comprising means for removably connecting the bracket to the power tool.

32. The optical alignment system of claim 20, further comprising at least one spacing connector movably connecting the first bracket receptacle to the second bracket receptacle.

33. The optical alignment system of claim 32, wherein said spacing connector comprises a telescoping arm.

34. The optical alignment system of claim 20, further comprising means for adjusting the distance between the first and second holders.

35. A power tool comprising:
a rotatable spindle defining an axis of operation;
a bracket attachable to the power tool;
a first holder movably received in said bracket and being selectively rotatable about a first holder axis that is substantially parallel to the axis of operation;
a second holder movably received in said bracket and being selectively rotatable about a second holder axis that is substantially parallel to the axis of operation;
a first laser generator supported within said first holder for selective rotation about a first laser axis that is not parallel to said first holder axis; and
a second laser generator supported within said second holder for selective rotation about a second laser axis that is not parallel to said second holder axis.

36. The power tool of claim 35 wherein said spindle is movably supported by a quill.

37. The power tool of claim 36 wherein said bracket is movably attached to said quill.

38. The power tool of claim 37 wherein said bracket is selectively rotatable about said quill and said axis of operation.

39. The power tool of claim 35 further comprising:
a first receptacle in said bracket and a second receptacle in said bracket spaced from said first receptacle, said first holder being retained in said first receptacle for selective rotation about said first holder axis and said second holder being retained in said second receptacle for selective rotation about said second holder axis;
at least one first retainer in said first holder for orienting and retaining said first laser generator therein such that said first laser axis is located at a desired first dip angle relative to said first holder axis; and
at least one second retainer in said second holder for orienting and retaining said second laser generator therein such that said second laser axis is located at a desired second dip angle relative to said second holder axis.

40. The power tool of claim 39 wherein said at least one first retainer comprises a plurality of first snap fit pillars and wherein said at least one second retainer comprises a plurality of second snap fit pillars.

41. The power tool of claim 39 further comprising:
a handle on at least one of first and second laser generators.

42. The power tool of claim 39 further comprising a first holder cover removably covering said first holder.

43. The power tool of claim 42 wherein the first holder cover is removably attached to said bracket by fasteners selected from the group of fasteners consisting of threaded fasteners and hook and loop fasteners.

44. The power tool of claim 42 further comprising at least one first tab on said first cover for preventing rotation of said first laser generator within said first holder when said first cover is received over said first holder.

45. The power tool of claim 42 further comprising a second holder cover removably covering said second holder.

46. The power tool of claim 45 wherein the second holder cover is removably attached to said bracket by fasteners selected from the group of fasteners consisting of threaded fasteners and hook and loop fasteners.

47. The power tool of claim 45 further comprising at least one second tab on said second cover for preventing rotation of said second laser generator within said second holder when said second holder cover is received over said second holder.

48. A power tool comprising:
means for defining an axis of operation;
first means for generating a first fan beam of light;
second means for generating a second fan beam of light;
first holder means for holding said first means for generating, said first holder means rotatably supported on said power tool for selective rotation about a first holder axis substantially parallel to said axis of operation;
first retention means for retaining said first generating means within said first holder means and orienting said first generating means such that a first generating axis of said first generating means is oriented at a first dip angle relative to said first holder axis;
second holder means for holding said second means for generating, said second holder means rotatably supported on said power tool about a second holder axis substantially parallel to said axis of operation; and
second retention means for retaining said second generating means within said second holder means and orienting said second generating means such that a second generating axis of said second generating means is oriented at a second dip angle relative to said second holder axis.

49. The power tool of claim 48 further comprising means on said first generating means for selectively rotating said first generating means about said first generating axis.

50. The power tool of claim 49 further comprising means on said second generating means for selectively rotating said second generating means about said second generating axis.

* * * * *

UNITED STATES PATENT AND TRADEMARK OFFICE
CERTIFICATE OF CORRECTION

PATENT NO. : 6,937,336 B2 Page 1 of 1
APPLICATION NO. : 10/219576
DATED : August 30, 2005
INVENTOR(S) : Garcia et al.

It is certified that error appears in the above-identified patent and that said Letters Patent is hereby corrected as shown below:

On the title page item [56]:
Under U.S. Patent Documents:
Pg. 1, Column 1, Ln. 61: delete "2,146,906-Molier" and substitute therefor --2,146,906-Moller--
Pg. 2, Column 2 (under Foreign Patents): delete "DE 33334284 A1 4/1985" and substitute therefor --DE 3333428 A1 4/1985--

In the Abstract
Column 2, Ln. 62 delete "and first second holders" and substitute therefor --and first and second holders--

In Description of Document
Column 1, Ln. 38: delete "to the invention" and substitute therefor --to the present invention--

Column 2, Ln. 46: delete "in one" and substitute therefor --In one--

Column 2, Ln. 63: delete "However. Other commercially" and substitute therefor -- However, other commercially--

Signed and Sealed this

Seventeenth Day of October, 2006

JON W. DUDAS
*Director of the United States Patent and Trademark Office*